(12) United States Patent
Michels et al.

(10) Patent No.: US 9,313,047 B2
(45) Date of Patent: Apr. 12, 2016

(54) HANDLING HIGH THROUGHPUT AND LOW LATENCY NETWORK DATA PACKETS IN A TRAFFIC MANAGEMENT DEVICE

(75) Inventors: Tim S. Michels, Greenacres, WA (US); Dave Schmitt, Seattle, WA (US); Paul I. Szabo, Shoreline, WA (US)

(73) Assignee: F5 Networks, Inc., Seattle, WA (US)

( * ) Notice: Subject to any disclaimer, the term of this patent is extended or adjusted under 35 U.S.C. 154(b) by 422 days.

(21) Appl. No.: 12/613,783

(22) Filed: Nov. 6, 2009

(65) Prior Publication Data

US 2015/0049763 A1 Feb. 19, 2015

(51) Int. Cl.
*H04L 12/64* (2006.01)
*H04L 12/46* (2006.01)
*H04L 12/879* (2013.01)
*H04L 12/935* (2013.01)
*H04L 12/863* (2013.01)
*H04L 12/933* (2013.01)

(Continued)

(52) U.S. Cl.
CPC ........ *H04L 12/6418* (2013.01); *H04L 12/4604* (2013.01); *H04L 12/64* (2013.01); *H04L 49/901* (2013.01); *H04L 12/5601* (2013.01); *H04L 45/00* (2013.01); *H04L 47/6215* (2013.01); *H04L 49/107* (2013.01); *H04L 49/108* (2013.01); *H04L 49/256* (2013.01); *H04L 49/309* (2013.01); *H04L 49/90* (2013.01)

(58) Field of Classification Search
CPC ..... H04L 49/901; H04L 49/90; H04L 49/309; H04L 49/256; H04L 49/108; H04L 49/107; H04L 47/6215; H04L 45/00; H04L 12/5601; H04L 12/64; H04L 12/4604; H04L 12/6418
See application file for complete search history.

(56) References Cited

U.S. PATENT DOCUMENTS 3,950,735 A 4/1976 Patel
4,644,532 A 2/1987 George et al.
(Continued)

FOREIGN PATENT DOCUMENTS

EP 0744850 A2 11/1996
EP 1813084 A1 8/2007
(Continued)

OTHER PUBLICATIONS

Anonymous, "Memory Mapping and DMA," Chapter 15, pp. 412-463, Jan. 21, 2005.
(Continued)

*Primary Examiner* — Jae Y Lee
*Assistant Examiner* — Aixa Guadalupe-Cruz
(74) *Attorney, Agent, or Firm* — LeClairRyan, a Professional Corporation

(57) ABSTRACT

Handling network data packets classified as being high throughput and low latency with a network traffic management device is disclosed. Packets are received from a network and classified as high throughput or low latency based on packet characteristics or other factors. Low latency classified packets are generally processed immediately, such as upon receipt, while the low latency packet processing is strategically interrupted to enable processing coalesced high throughput classified packets in an optimized manner. The determination to cease processing low latency packets in favor of high throughput packets may be based on a number of factors, including whether a threshold number of high throughput classified packets are received or based on periodically polling a high throughput packet memory storage location.

21 Claims, 4 Drawing Sheets

(51) Int. Cl.
  *H04L 12/861* (2013.01)
  *H04L 12/54* (2013.01)
  *H04L 12/701* (2013.01)
  *H04L 12/947* (2013.01)

(56) References Cited

U.S. PATENT DOCUMENTS

| | | |
|---|---|---|
| 4,897,781 A | 1/1990 | Chang et al. |
| 4,914,650 A | 4/1990 | Sriram |
| 4,965,772 A | 10/1990 | Daniel et al. |
| 5,023,826 A | 6/1991 | Patel |
| 5,053,953 A | 10/1991 | Patel |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,388,237 A | 2/1995 | Sodos et al. |
| 5,406,502 A | 4/1995 | Haramaty et al. |
| 5,475,857 A | 12/1995 | Dally |
| 5,477,541 A | 12/1995 | White et al. |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,699,361 A | 12/1997 | Ding et al. |
| 5,742,765 A | 4/1998 | Wong et al. |
| 5,752,023 A | 5/1998 | Choucri et al. |
| 5,761,484 A | 6/1998 | Agarwal et al. |
| 5,761,534 A | 6/1998 | Lundberg et al. |
| 5,768,423 A | 6/1998 | Aref et al. |
| 5,774,660 A | 6/1998 | Brendel et al. |
| 5,790,554 A | 8/1998 | Pitcher et al. |
| 5,797,033 A | 8/1998 | Ecclesine |
| 5,802,052 A | 9/1998 | Venkataraman |
| 5,812,550 A | 9/1998 | Sohn et al. |
| 5,825,772 A | 10/1998 | Dobbins et al. |
| 5,828,835 A * | 10/1998 | Isfeld et al. .................. 709/200 |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 6,006,260 A | 12/1999 | Barrick, Jr. et al. |
| 6,006,264 A | 12/1999 | Colby et al. |
| 6,026,090 A | 2/2000 | Benson et al. |
| 6,026,443 A | 2/2000 | Oskouy et al. |
| 6,026,452 A | 2/2000 | Pitts |
| 6,028,857 A | 2/2000 | Poor |
| 6,051,169 A | 4/2000 | Brown et al. |
| 6,070,219 A | 5/2000 | McAlpine et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,115,802 A | 9/2000 | Tock et al. |
| 6,128,279 A | 10/2000 | O'Neil et al. |
| 6,128,657 A | 10/2000 | Okanoya et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,337 B1 | 2/2002 | Shah et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,388,989 B1 | 5/2002 | Malhotra |
| 6,396,833 B1 | 5/2002 | Zhang et al. |
| 6,411,986 B1 | 6/2002 | Susai et al. |
| 6,484,261 B1 | 11/2002 | Wiegel |
| 6,490,624 B1 | 12/2002 | Sampson et al. |
| 6,510,135 B1 | 1/2003 | Almulhem et al. |
| 6,519,643 B1 | 2/2003 | Foulkes et al. |
| 6,529,508 B1 | 3/2003 | Li et al. |
| 6,574,220 B1 | 6/2003 | Petty |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,691,165 B1 | 2/2004 | Bruck et al. |
| 6,700,871 B1 | 3/2004 | Harper et al. |
| 6,708,187 B1 | 3/2004 | Shanumgam et al. |
| 6,742,045 B1 | 5/2004 | Albert et al. |
| 6,748,457 B2 | 6/2004 | Fallon et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,781,990 B1 | 8/2004 | Puri et al. |
| 6,785,236 B1 | 8/2004 | Lo et al. |
| 6,798,777 B1 | 9/2004 | Ferguson et al. |
| 6,816,901 B1 | 11/2004 | Sitaraman et al. |
| 6,820,133 B1 | 11/2004 | Grove et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,904,040 B2 | 6/2005 | Salapura et al. |
| 6,928,082 B2 | 8/2005 | Liu et al. |
| 6,934,776 B2 | 8/2005 | Connor et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,975,592 B1 | 12/2005 | Seddigh et al. |
| 6,999,457 B2 | 2/2006 | Shinohara |
| 7,007,092 B2 | 2/2006 | Peiffer |
| 7,046,628 B2 | 5/2006 | Luhmann et al. |
| 7,065,630 B1 | 6/2006 | Ledebohm et al. |
| 7,107,348 B2 | 9/2006 | Shimada et al. |
| 7,117,308 B1 | 10/2006 | Mitten et al. |
| 7,124,196 B2 | 10/2006 | Hooper |
| 7,139,792 B1 | 11/2006 | Mishra et al. |
| 7,142,540 B2 | 11/2006 | Hendel et al. |
| 7,164,678 B2 | 1/2007 | Connor |
| 7,174,393 B2 | 2/2007 | Boucher et al. |
| 7,236,491 B2 | 6/2007 | Tsao et al. |
| 7,272,150 B2 | 9/2007 | Bly et al. |
| 7,281,030 B1 | 10/2007 | Davis |
| 7,321,926 B1 | 1/2008 | Zhang et al. |
| 7,324,525 B2 | 1/2008 | Fuhs et al. |
| 7,327,674 B2 | 2/2008 | Eberle et al. |

(56) References Cited

U.S. PATENT DOCUMENTS

| | | |
|---|---|---|
| 7,343,413 B2 | 3/2008 | Gilde et al. |
| 7,349,391 B2 | 3/2008 | Ben-Dor et al. |
| 7,349,405 B2 | 3/2008 | Deforche |
| 7,353,326 B2 | 4/2008 | Cho et al. |
| 7,355,977 B1 | 4/2008 | Li |
| 7,359,321 B1 | 4/2008 | Sindhu et al. |
| 7,376,772 B2 | 5/2008 | Fallon |
| 7,403,542 B1 | 7/2008 | Thompson |
| 7,411,957 B2 | 8/2008 | Stacy et al. |
| 7,415,034 B2 | 8/2008 | Muller et al. |
| 7,420,931 B2 | 9/2008 | Nanda et al. |
| 7,457,313 B2 | 11/2008 | Patrick |
| 7,475,122 B2 | 1/2009 | Azpitarte |
| 7,478,186 B1 | 1/2009 | Onufryk et al. |
| 7,490,162 B1 | 2/2009 | Masters |
| 7,493,398 B2 | 2/2009 | Bush |
| 7,496,689 B2 | 2/2009 | Sharp et al. |
| 7,496,695 B2 | 2/2009 | Go et al. |
| 7,500,028 B2 | 3/2009 | Yamagishi |
| 7,512,078 B2 | 3/2009 | Swain |
| 7,512,721 B1 | 3/2009 | Olson |
| 7,533,197 B2 | 5/2009 | Leonard et al. |
| 7,552,232 B2 | 6/2009 | Helmer, Jr. et al. |
| 7,558,197 B1 | 7/2009 | Sindhu et al. |
| 7,558,910 B2 | 7/2009 | Alverson et al. |
| 7,571,299 B2 | 8/2009 | Loeb |
| 7,590,753 B2 | 9/2009 | Wolde et al. |
| 7,620,046 B2 | 11/2009 | Ronciak et al. |
| 7,620,071 B2 | 11/2009 | Makineni et al. |
| 7,621,162 B2 | 11/2009 | Bartky |
| 7,647,416 B2 | 1/2010 | Chiang et al. |
| 7,657,659 B1 | 2/2010 | Lambeth et al. |
| 7,660,916 B2 | 2/2010 | Moskalev et al. |
| 7,668,727 B2 | 2/2010 | Mitchell et al. |
| 7,668,851 B2 | 2/2010 | Triplett |
| 7,680,915 B2 | 3/2010 | Still et al. |
| 7,710,989 B2 | 5/2010 | Chew |
| 7,729,239 B1 * | 6/2010 | Aronov et al. ............... 370/229 |
| 7,734,809 B2 | 6/2010 | Joshi et al. |
| 7,735,099 B1 | 6/2010 | Micalizzi, Jr. |
| 7,742,412 B1 | 6/2010 | Medina |
| 7,784,093 B2 | 8/2010 | Deng et al. |
| 7,813,277 B2 | 10/2010 | Okholm et al. |
| 7,826,487 B1 | 11/2010 | Mukerji et al. |
| 7,840,841 B2 | 11/2010 | Huang et al. |
| 7,877,524 B1 | 1/2011 | Annem et al. |
| 7,916,728 B1 | 3/2011 | Mimms |
| 7,929,433 B2 | 4/2011 | Husak et al. |
| 7,936,772 B2 | 5/2011 | Kashyap |
| 7,991,918 B2 | 8/2011 | Jha et al. |
| 7,996,569 B2 | 8/2011 | Aloni et al. |
| 8,006,016 B2 | 8/2011 | Muller et al. |
| 8,077,620 B2 | 12/2011 | Solomon et al. |
| 8,099,528 B2 | 1/2012 | Millet et al. |
| 8,103,809 B1 | 1/2012 | Michels et al. |
| 8,112,491 B1 | 2/2012 | Michels et al. |
| 8,112,594 B2 | 2/2012 | Giacomoni et al. |
| 8,130,650 B2 | 3/2012 | Allen, Jr. et al. |
| 8,233,380 B2 | 7/2012 | Subramanian et al. |
| 8,279,865 B2 | 10/2012 | Giacomoni et al. |
| 8,306,036 B1 | 11/2012 | Bollay et al. |
| 8,346,993 B2 | 1/2013 | Michels et al. |
| 8,447,884 B1 | 5/2013 | Baumann |
| 8,448,234 B2 | 5/2013 | Mondaeev et al. |
| 8,799,403 B2 | 8/2014 | Chan et al. |
| 8,848,715 B2 | 9/2014 | Izenberg et al. |
| 8,880,632 B1 | 11/2014 | Michels et al. |
| 8,880,696 B1 | 11/2014 | Michels et al. |
| 8,984,178 B2 | 3/2015 | Michels et al. |
| 9,032,113 B2 | 5/2015 | Conroy et al. |
| 2001/0023442 A1 | 9/2001 | Masters |
| 2001/0038629 A1 | 11/2001 | Shinohara |
| 2001/0042200 A1 | 11/2001 | Lamberton et al. |
| 2002/0143955 A1 | 10/2002 | Shimada et al. |
| 2002/0156927 A1 | 10/2002 | Boucher et al. |
| 2002/0161913 A1 | 10/2002 | Gonzalez et al. |
| 2002/0198993 A1 | 12/2002 | Cudd et al. |
| 2003/0046291 A1 | 3/2003 | Fascenda |
| 2003/0067930 A1 | 4/2003 | Salapura et al. |
| 2003/0086415 A1 | 5/2003 | Bernhard et al. |
| 2003/0204636 A1 | 10/2003 | Greenblat et al. |
| 2003/0225485 A1 | 12/2003 | Fritz et al. |
| 2004/0032830 A1 | 2/2004 | Bly et al. |
| 2004/0062245 A1 | 4/2004 | Sharp et al. |
| 2004/0202161 A1 | 10/2004 | Stachura et al. |
| 2004/0249881 A1 | 12/2004 | Jha et al. |
| 2004/0249948 A1 | 12/2004 | Sethi et al. |
| 2004/0267897 A1 | 12/2004 | Hill et al. |
| 2005/0007991 A1 | 1/2005 | Ton et al. |
| 2005/0050364 A1 | 3/2005 | Feng |
| 2005/0083952 A1 | 4/2005 | Swain |
| 2005/0091390 A1 | 4/2005 | Helmer et al. |
| 2005/0114559 A1 | 5/2005 | Miller |
| 2005/0122977 A1 | 6/2005 | Lieberman |
| 2005/0141427 A1 | 6/2005 | Bartky |
| 2005/0175014 A1 | 8/2005 | Patrick |
| 2005/0187866 A1 | 8/2005 | Lee |
| 2005/0213570 A1 | 9/2005 | Stacy et al. |
| 2005/0226234 A1 | 10/2005 | Sano et al. |
| 2006/0007928 A1 | 1/2006 | Sangillo |
| 2006/0059267 A1 | 3/2006 | Cugi et al. |
| 2006/0067349 A1 | 3/2006 | Ronciak et al. |
| 2006/0104303 A1 | 5/2006 | Makineni et al. |
| 2006/0174324 A1 | 8/2006 | Zur et al. |
| 2006/0221832 A1 | 10/2006 | Muller et al. |
| 2006/0221835 A1 | 10/2006 | Sweeney |
| 2006/0224820 A1 | 10/2006 | Cho et al. |
| 2006/0235996 A1 | 10/2006 | Wolde et al. |
| 2006/0288128 A1 | 12/2006 | Moskalev et al. |
| 2007/0083646 A1 | 4/2007 | Miller et al. |
| 2007/0107048 A1 | 5/2007 | Halls et al. |
| 2007/0118879 A1 | 5/2007 | Yeun |
| 2007/0162619 A1 | 7/2007 | Aloni et al. |
| 2007/0174491 A1 | 7/2007 | Still et al. |
| 2008/0126509 A1 | 5/2008 | Subramanian et al. |
| 2008/0133518 A1 | 6/2008 | Kapoor et al. |
| 2008/0184248 A1 | 7/2008 | Barua et al. |
| 2008/0201772 A1 | 8/2008 | Mondaeev et al. |
| 2008/0219279 A1 * | 9/2008 | Chew ............................ 370/412 |
| 2009/0003204 A1 | 1/2009 | Okholm et al. |
| 2009/0007266 A1 | 1/2009 | Wu et al. |
| 2009/0016217 A1 | 1/2009 | Kashyap |
| 2009/0049230 A1 | 2/2009 | Pandya |
| 2009/0089619 A1 | 4/2009 | Huang et al. |
| 2009/0141891 A1 | 6/2009 | Boyen et al. |
| 2009/0154459 A1 | 6/2009 | Husak et al. |
| 2009/0222598 A1 | 9/2009 | Hayden |
| 2009/0248911 A1 | 10/2009 | Conroy et al. |
| 2009/0279559 A1 | 11/2009 | Wong et al. |
| 2009/0287935 A1 | 11/2009 | Aull et al. |
| 2010/0082849 A1 | 4/2010 | Millet et al. |
| 2010/0085875 A1 | 4/2010 | Solomon et al. |
| 2010/0094945 A1 | 4/2010 | Chan et al. |
| 2010/0122091 A1 | 5/2010 | Huang et al. |
| 2010/0325277 A1 | 12/2010 | Muthiah et al. |
| 2011/0228781 A1 | 9/2011 | Izenberg et al. |
| 2012/0191800 A1 | 7/2012 | Michels et al. |
| 2013/0250777 A1 | 9/2013 | Ziegler |
| 2014/0032695 A1 | 1/2014 | Michels et al. |
| 2014/0185442 A1 | 7/2014 | Newman et al. |
| 2014/0301207 A1 | 10/2014 | Durand et al. |

FOREIGN PATENT DOCUMENTS

| | | |
|---|---|---|
| WO | WO 91/14326 | 9/1991 |
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |

(56) References Cited

FOREIGN PATENT DOCUMENTS

| WO | WO 00/04458 | 1/2000 |
|---|---|---|
| WO | 2004079930 A2 | 9/2004 |
| WO | WO 2006/055494 A1 | 5/2006 |
| WO | 2009158680 A1 | 12/2009 |

OTHER PUBLICATIONS

Bell Laboratories, "Layer 4/7 Switching and Other Custom IP Traffic Processing using the NEPPI API," Lucent Technologies, pp. 1-11, Murray Hill, NJ.
"DMA and Interrupt Handling," EventHelix.com.
Harvey A.F. et al., "DMA Fundamentals on Various PC Platforms," National Instruments Corporation: Application Note 011, Apr. 1991, pp. 1-18, 340023-01.
Mangino John, "Using DMA with High Performance Peripherals to Maximize System Performance," WW TMS470 Catalog Applications, SPNA105, Jan. 2007, PowerPoint presentation, slides 1-23.
Mogul, Jeffrey, C., "The Case for Persistent-Connection HTTP," SIGCOMM '95, 1995, pp. 299-313, Cambridge, MA.
Rabinovich, Michael et al., "DHTTP: An Efficient and Cache-Friendly Transfer Protocol for the Web," IEEE/ACM Transactions on Networking, Dec. 2004, pp. 1007-1020, vol. 12, No. 6.
Stevens, W., "TCP Slow Start, Congestion Avoidance, Fast Retransmit, and Fast Recovery Algorithms," Network Working Group; RFC: 2001; Standards Track, Jan. 1997, pp. 1-6, NOAO.
"TCP-Transmission Control Protocol (TCP Fast Retransmit and Recovery)," EventHelix.com/EventStudio1.0, Mar. 28, 2002, pp. 1-5.
Wadge, Wallace, "Achieving Gigabit Performance on Programmable Ethernet Network Interface Cards," May 29, 2001, pp. 1-9.
Wikipedia, "Direct memory access," <http://en.wikipedida.org/wiki/Direct_memory_access>, last modified Oct. 1, 2009.
Wikipedia, "Nagle's algorithm," <http://en.wikipedia.org/wiki/Nagle%27s_algorithm>, last modified Oct. 9, 2009.
"Cavium Networks Product Selector Guide—Single & Multi-Core MIPS Processors, Security Processors and Accelerator Boards—Spring 2008," (2008) pp. 1-44, Cavium Networks, Mountain View, CA, US.
"Comtech AHA Announces 3.0 Gbps GZIP Compression/Decompression Accelerator AHA362-PCIX offers high-speed GZIP compression and decompression," www.aha.com, Apr. 20, 2005, pp. 1-2, Comtech AHA Corporation, Moscow, ID, USA.
"Comtech AHA Announces GZIP Compression and Decompression IC Offers the highest speed and compression ratio performance in hardware on the market," www.aha.com, Jun. 26, 2007, pp. 1-2, Comtech AHA Corporation, Moscow, ID, USA.
"Gigabit Ethernet/PCI Network Interface Card; Host/NIC Software Interface Definition," Jul. 1999, pp. 1-80, Revision 12.4.13, P/N 020001, Alteon WebSystems, Inc., San Jose, California.
"NITROX™ XL Security Acceleration Modules PCI 3V or 3V/5V-Universal Boards for SSL and IPSec," at http://www.Caviumnetworks.com, (2002) pp. 1, Cavium Networks, Mountain View, CA USA.

"PCI, PCI-X," at http://www.cavium.com/acceleration_boards_PCI_PCI-X.htm (Downloaded Oct. 2008), Cavium Networks—Products > Acceleration Boards > PCI, PCI-X.
"Plan 9 kernel history: overview / file list / diff list," <http://switch.com/cgi-bin/plan9history.cgi?f=2001/0126/pc/etherga620.com>, accessed Oct. 22, 2007, pp. 1-16.
Welch, Von, "A User's Guide to TCP Windows," http://www.vonwelch.com/report/tcp_windows, updated 1996, last accessed Jan. 29, 2010, pp. 1-5.
Salchow, Jr., KJ, "Clustered Multiprocessing: Changing the Rules of the Performance Game," F5 White Paper, Jan. 2008, pp. 1-11, F5 Networks, Inc.
"A Process for Selective Routing of Servlet Content to Transcoding Modules," Research Disclosure 422124, Jun. 1999, pp. 889-890, IBM Corporation.
F5 Networks, Inc., "BIG-IP Controller with Exclusive OneConnect Content Switching Feature Provides a Breakthrough System for Maximizing Server and Network Performance," Press Release, May 8, 2001, 2 pages, Las Vegas, Nevada.
Crescendo Networks, "Application Layer Processing (ALP)," 2003-2009, pp. 168-186, Chapter 9, CN-5000E/5500E, Foxit Software Company.
Fielding et al., "Hypertext Transfer Protocol—HTTP/1.1," Network Working Group, RFC: 2068, Jan. 1997, pp. 1-162.
Fielding et al., "Hypertext Transfer Protocol—HTTP/1.1," Network Working Group, RFC: 2616, Jun. 1999, pp. 1-176, The Internet Society.
Floyd et al., "Random Early Detection Gateways for Congestion Avoidance," Aug. 1993, pp. 1-22, IEEE/ACM Transactions on Networking, California.
Hochmuth, Phil, "F5, CacheFlow pump up content-delivery lines," Network World Fusion, May 4, 2001, 1 page, Las Vegas, Nevada.
Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.
"Servlet/Applet/HTML Authentication Process With Single Sign-On," Research Disclosure 429128, Jan. 2000, pp. 163-164, IBM Corporation.
"Traffic Surges; Surge Queue; Netscaler Defense," 2005, PowerPoint Presentation, slides 1-12, Citrix Systems, Inc.
Williams et al., "The Ultimate Windows Server 2003 System Administrator's Guide: Forwarding Authentication," 2003, 2 pages, Figure 10.7, Addison-Wesley Professional, Boston, Massachusetts.
"Windows Server 2003 Kerberos Extensions," Microsoft TechNet, 2003 (Updated Jul. 31, 2004), http://technet.microsoft.com/en-us/library/cc738207, Microsoft Corporation.
MacVittie, Lori, "Message-Based Load Balancing," Technical Brief, Jan. 2010, pp. 1-9, F5 Networks, Inc.
International Search Report for Europe Patent Application No. 14191232.9 (Oct. 31, 2014).

\* cited by examiner

HANDLING HIGH THROUGHPUT AND LOW LATENCY NETWORK DATA PACKETS IN A TRAFFIC MANAGEMENT DEVICE

TECHNICAL FIELD

The technology generally relates to network traffic management, and more particularly, to handling communications among network applications involving the transfer of data in protocols with different throughput and latency characteristics.

BACKGROUND

The large number of network applications engaged in communications over various private and public networks (e.g., Internet) have imposed different demands on the network interface cards ("NICs") employed by the network devices involved in handling those communications. NICs generally handle data sent to or from a network device, generating processor interrupts as data is received or needs to be transmitted. Since interrupts are computationally expensive because the network device processors must switch context, it is generally desirable to interrupt the processors only as needed. Some data transfer protocols, such as FTP, however, are high throughput in nature because large numbers of packets are transferred at a time without requiring a relatively high number of processor interrupts for applications handling the packets. In this case, many packets may be coalesced before interrupting the processor.

Other types of data transfer protocols are low latency in nature because more frequent processor interrupts are needed by applications handling the packets. For example, the NFS protocol requires the receipt of confirmatory acknowledgement messages before subsequent file portions can be transmitted. In this case, the file transfer performance depends on the request to acknowledgement processing time or latency. Thus for such low latency type data, the best performance is achieved by interrupting processors immediately upon the arrival of packets embodying the file portions, which as noted above, is the exact opposite for high throughput type data.

SUMMARY

An application delivery controller device is configured to manage network communications among one or more network applications operating on devices in a network. The application delivery controller device has one or more processors coupled to a memory and a network interface controller configured to receive, transmit and process network communication data packets. The application delivery controller device receives the data packets from the network to be processed by one of the processors in accordance with one or more traffic management applications executing on the processors. The data packets are stored in either a low latency packet queue or a high throughput packet queue in the memory coupled to the one or more processors of the device. The application delivery controller device processes the low latency classified packets until determining one or more high throughput classified packets are ready to be processed. The determination may be based on whether a threshold number of high throughput packets have been coalesced in the memory or periodically polling the memory to ascertain whether one or more high throughput packets are present. After processing the high throughput classified packets, the application delivery controller device resumes processing low latency classified packets.

This summary is intended to provide a brief introduction to some of the concepts covered in this disclosure. Additional aspects will be apparent to those of ordinary skill in the art in view of the detailed description of various embodiments, which is made with reference to the drawings, a brief description of which is provided below.

These examples may be practiced in many different forms without departing from the spirit and scope of the teachings in this disclosure. Therefore, it should be understood that the present disclosure should be considered an exemplification and is not limited to the example illustrations.

DETAILED DESCRIPTION

Figure 1:
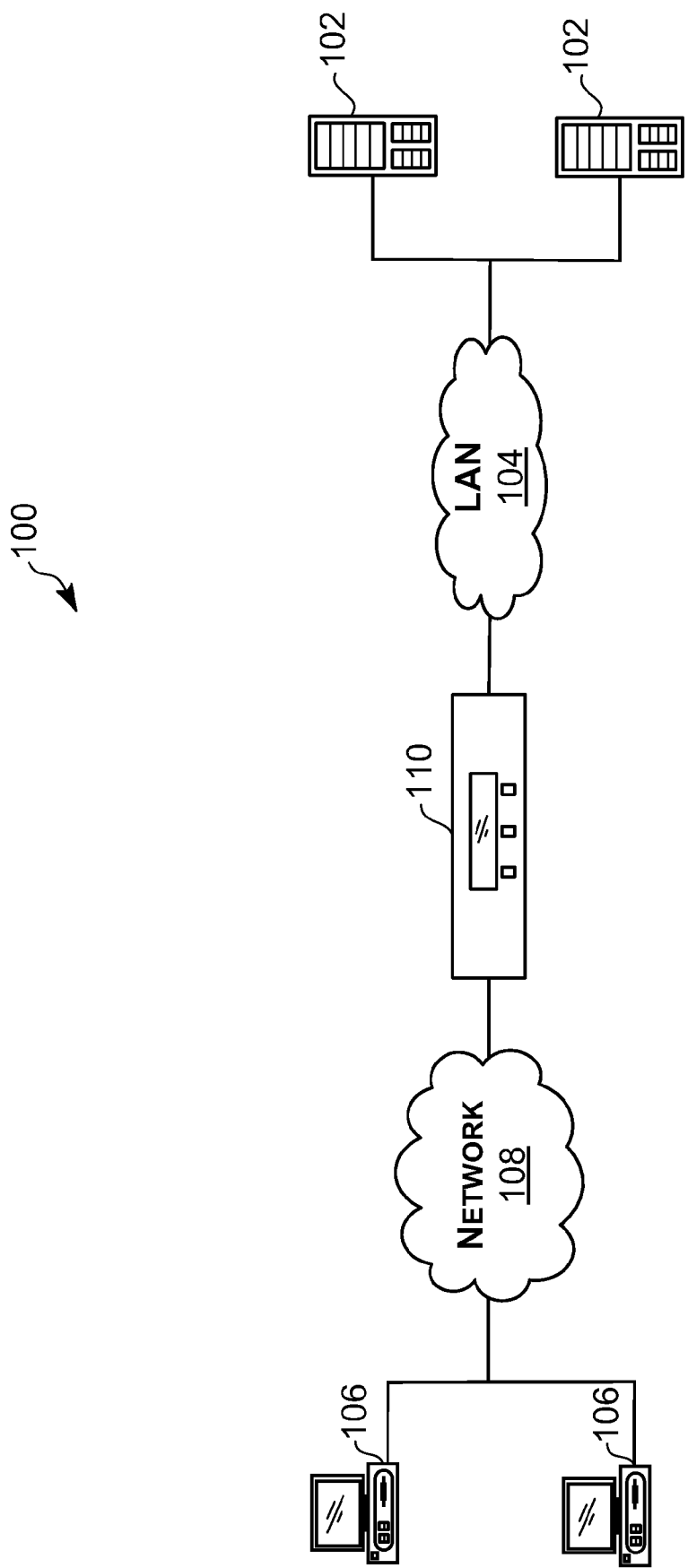
FIG. 1 is a diagram showing a network environment that may employ an application delivery controller capable of handling high throughput and low latency network data packets.

Referring to FIG. 1, an example system 100 includes one or more servers 102, one or more clients 106, and an application delivery controller device 110, which are coupled together by LAN 104 and network 108. While not shown, the system 100 may include additional network components, such as routers, switches and other devices. Generally, servers 102 process requests received from requesting clients 106 over LAN 104 and network 108 according to the HTTP-based application RFC protocol or the CIFS or NFS protocol in this example, but the principles discussed herein are not limited to this example and can include other application protocols. The application delivery controller device 110 is coupled to the server 102 through a local area network (LAN) 104 in this example, although the servers and controller may be coupled together via other topologies. The application delivery controller device 110 is also coupled to the client computers 106 through the network 108, for example, which may comprise any wide area network (e.g., Internet) or any other type of network topology. The client computers 106, in this example, may run interface applications such as Web browsers that may provide an interface to make requests for and send data to different web server based applications via the network 108. A series of applications may run on the servers 102 that allow the transmission of data that is requested by the client computers 106. The servers 102 may provide data or receive data in response to requests directed toward the respective applications on the servers 102 from the client computers 106. As per TCP, packets may be sent to the server 102 from the requesting client computers 106 to send data. It is to be understood that the servers 102 may be hardware or software or may represent a system with multiple servers 102, which may include internal or external networks. In this example the server 102 may be any version of Microsoft® IIS servers or Apache® servers, although other types of servers may be used. Further, additional servers may be coupled to the local area network 104 and many different types of applications may be available on servers coupled to the LAN 104.

As will be described in further detail below in connection with FIGS. 2-3, the application delivery controller device 110 may include a network interface controller ("NIC") 200 to transmit and receive data packets from network 108 and the LAN 104. Various network processing applications, such as CIFS applications, NFS applications, HTTP Web Server applications, FTP applications, may be operating on servers 102 and transmitting data (e.g., files, Web pages) through the application delivery controller device 110 to clients 106 responsive to requests from those clients. It is to be understood that the NIC 200 may take the form of a network peripheral card that is installed inside a bus interface within application delivery controller device 110 or may be an embedded component as part of a computer processor motherboard, a router or printer interface, or a USB device that may be internal or external to the server 102.

In this example, the application delivery controller device 110 runs one or more traffic management applications on one or more host system processors 210 to manage network traffic by optimizing, securing and accelerating the traffic between clients 106 and servers 102, for example, although the controller device 110 may perform other network related functions, such as establishing virtual private networks. Moreover, the network traffic managed by the application delivery controller device 110 may be received and transmitted by the device 110 from and to the LAN 104 and network 108 in the form of network data packets in the TCP/IP protocol, although the network data packets could be in other network protocols.

Figure 2:
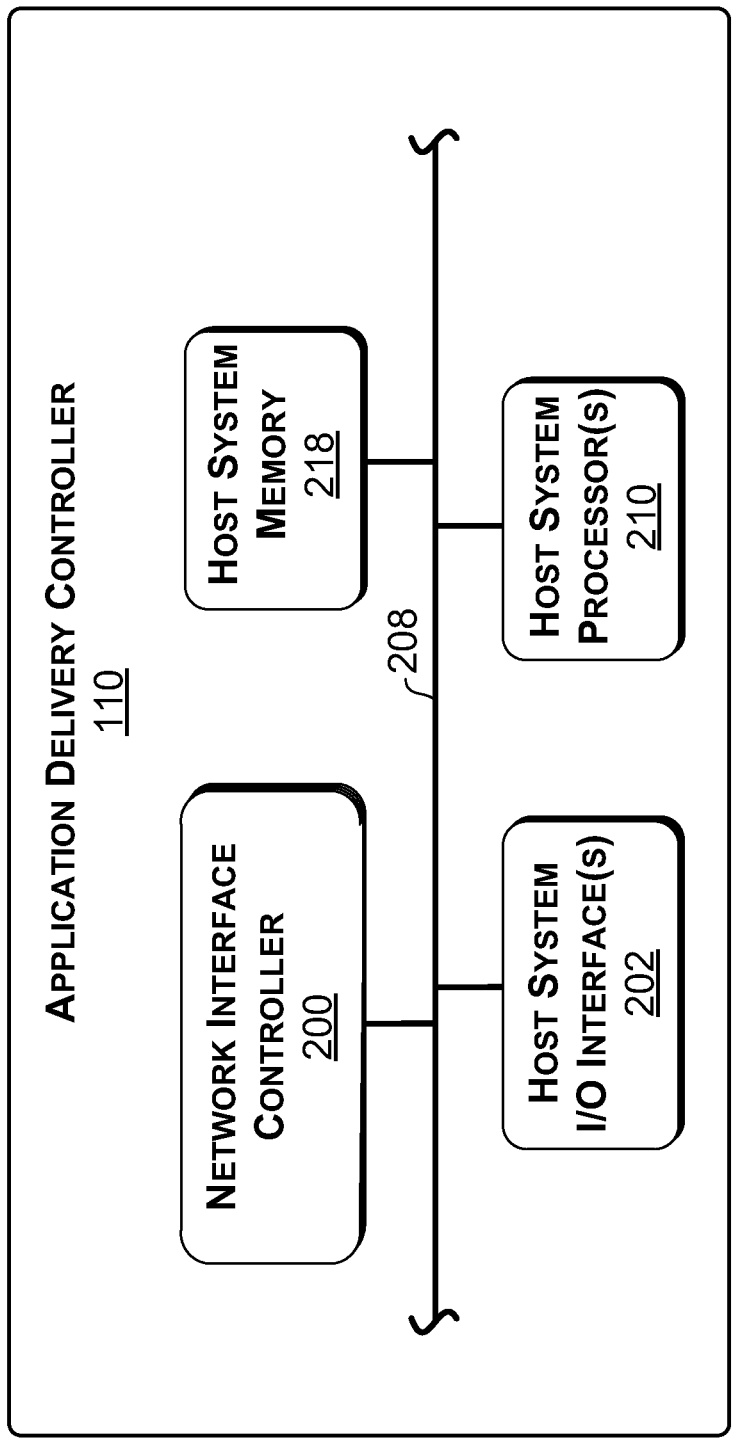
FIGS. 2 and 3 are diagrams of an example application delivery controller shown in FIG. 1.
Figure 3:
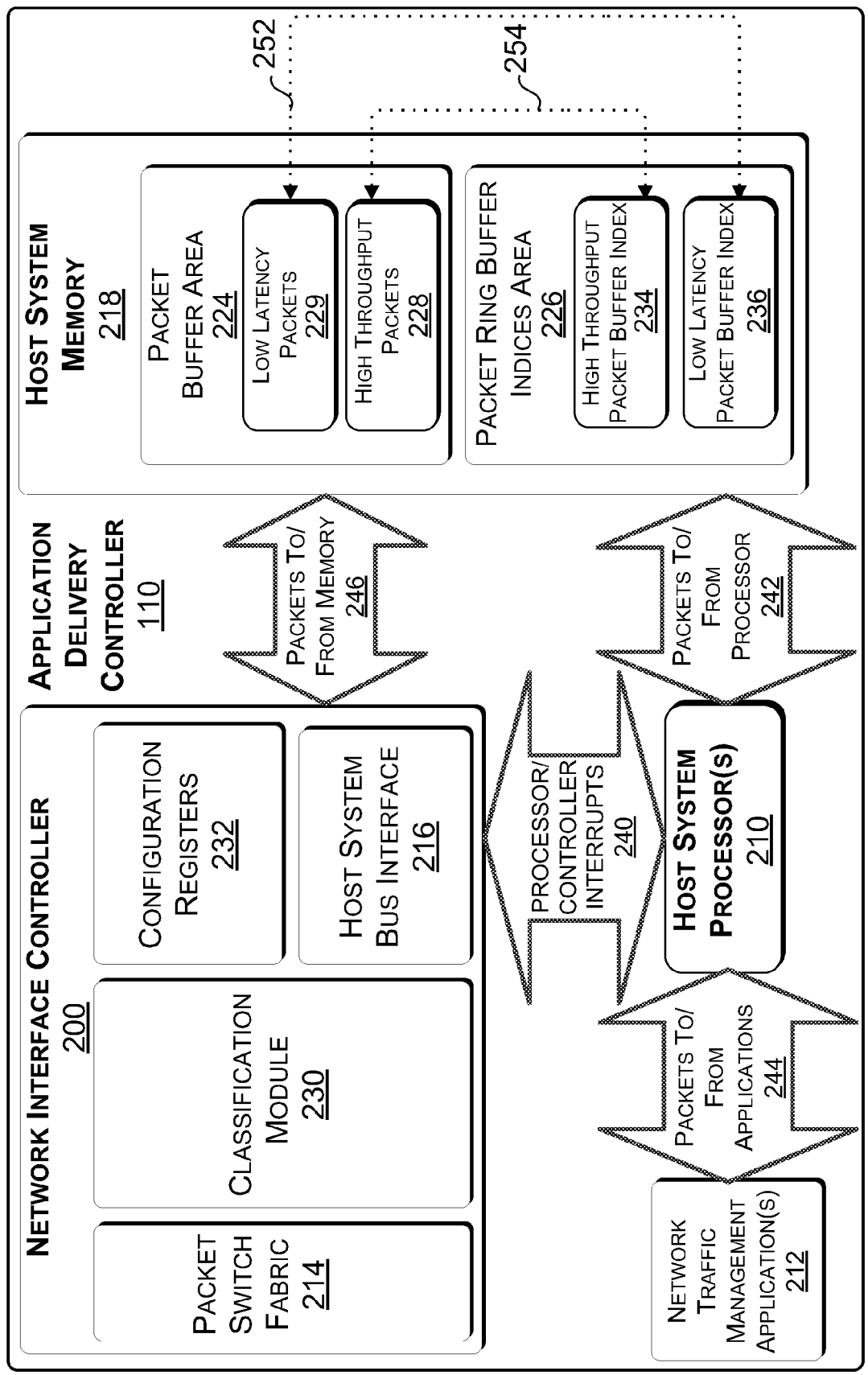

Referring now to FIGS. 2-3, an example application delivery controller device 110 configured to handle both high throughput data packets and low latency data packets transmitted between clients 106 and servers 102 over LAN 104 and network 108 will now be described. In this example, the application delivery controller device 110 includes the NIC 200, host system I/O interface(s) 202, host system processors 210, and host system memory 218, which are coupled together by bus 208. Although the application delivery controller device 110 is shown in FIG. 1 in this example as being a standalone device, such as a BIG-IP® application delivery controller offered by F5 Networks, Inc., of Seattle, Wash., it should be appreciated that the device 110 could also be one of several blades servers coupled to a chassis device, such as a VIPRION® application delivery controller, also offered by F5 Networks, Inc., of Seattle, Wash.

NIC 200 may comprise specialized hardware to achieve maximum execution speeds, such a field programmable gate arrays ("FPGAs"), although other hardware and/or software may be used, such as ASICs, field programmable logic devices ("FPLDs"), programmable logic units ("PLUs"), software executed by the host system processor 210, and combinations thereof. The use of the specialized hardware in this example, however, allows the NIC 200 to rapidly respond to received packets and to rapidly classify packets as being low latency or high throughput, as will be described in further detail below.

The bus 208 is a hyper-transport bus in this example, although other bus types may be used, such as PCI. Host system input/output interfaces 202 include one or more keyboard/mouse interfaces, display devices interfaces, and other physical and/or logical mechanisms for enabling the controller 110 to communicate with the outside environment, which includes network 108, LAN 104 and users (e.g., administrators) desiring to interact with the controller 110, such as to configure, program or operate it.

Host system processor(s) 210 executes the traffic management applications 212 that handle the network traffic between applications on the clients 106 and servers 102 being managed by the controller device 110, as mentioned earlier, as well as one or more computer-executable instructions stored in the host system memory 218, as well as other operations as mentioned herein. The host system processor(s) 210 may comprise one or more central processing units ("CPUs") or general purpose processors with one or more processing cores, such as AMD® processor(s), although other types of processor(s) could be used (e.g., Intel®).

Host system memory 218 may comprise one or more tangible storage media such as, for example, RAM, ROM, flash memory, CD-ROM, floppy disk, hard disk drive(s), solid state memory, DVD, or any other memory storage type or devices, including combinations thereof, which are known to those of ordinary skill in the art. Host system memory 218 stores the data packets received by NIC 200 in a packet buffer area 224, which is a non-contiguous memory storage space area, although contiguous memory may be used. Data packets classified by the classification module 230 (and/or the processor 210) are stored as low latency packets 229 and high throughput packets 228 in the packet buffer area 224 within memory 218. Further, the memory 218 includes a packet ring buffer indices area 226, which is a dedicated contiguous memory space that includes high throughput packet buffer index 234 and low latency packet buffer index 236, although other memory storage constructs could be used. Generally, the indices 234, 236 store an index to the location of the next low latency packet(s) 229 or high throughput packet 228 within the packet buffer area 224 to be processed by the processor(s) 210 the next time an interrupt is generated for processing either type of data in the form of a ring buffer, although other types of buffers may be used. As shown in FIG. 3, data packets 228 for high throughput and data packets 229 for low latency may be written in the packet buffer area 224. Although the packets 228 and 229 are shown written consecutively for convenience and ease of description in FIG. 3, it is to be understood that the packets 228 and 229 may be written in any order in any part of the packet buffer area 224.

Figure 4:
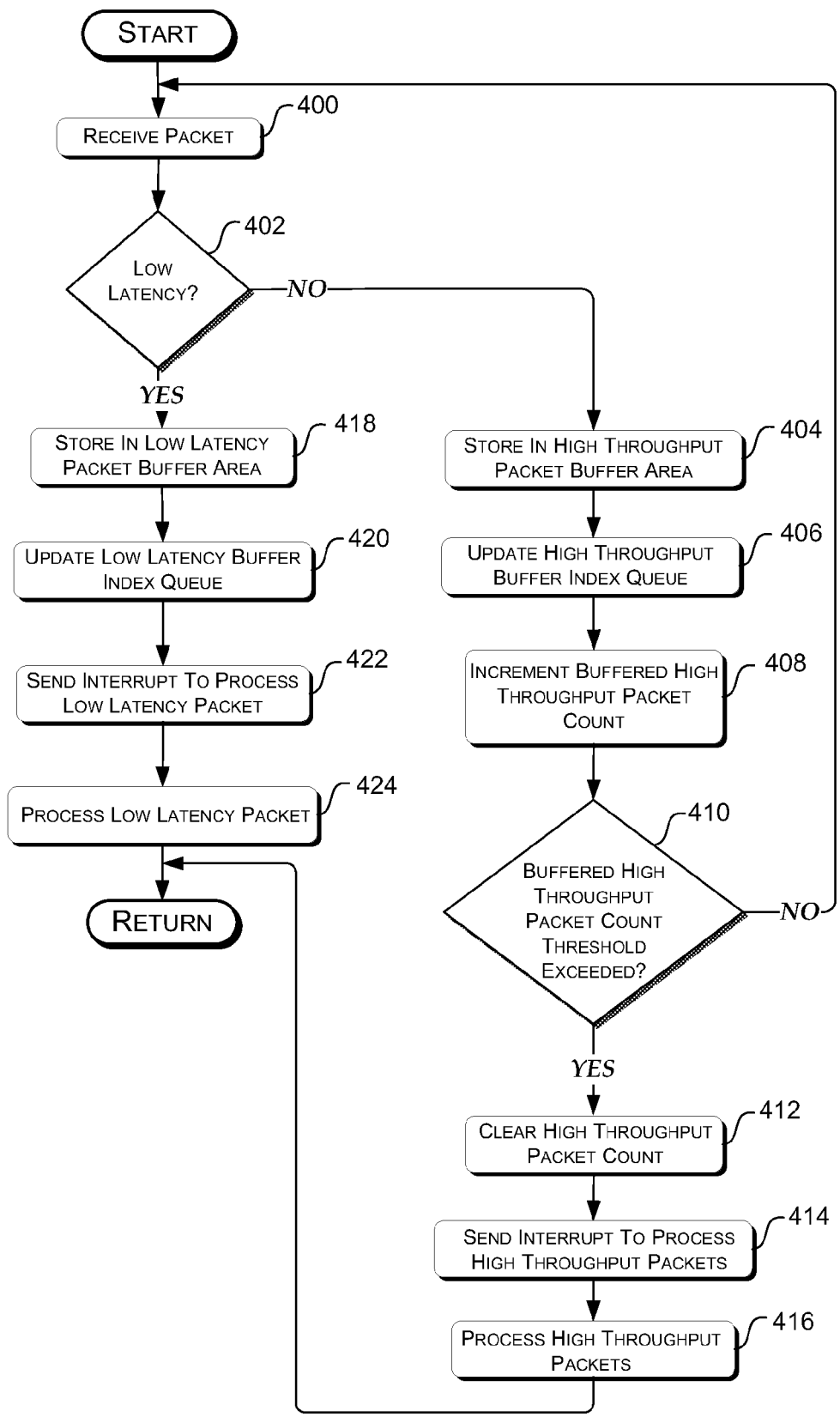
FIG. 4 is a flow chart of a process for handling high throughput and low latency network data packets that may be performed by the application delivery controller in FIGS. 2 and 3.

Further, host system memory 218 also stores one or more computer-readable instructions that may be executed by the one or more host system processor(s) 210 and/or the NIC 200. When these stored instructions are executed, they may implement a process that is illustrated, for exemplary purposes only, by the flow chart diagram shown in FIG. 4. It should be appreciated that the flow chart diagram shown in FIG. 4 is representative of example steps or actions that may be embodied or expressed as one or more computer or machine readable instructions that may be executed by the NIC 200 and/or the processor(s) 210 in the application delivery controller device 110 shown in FIGS. 1-3. In this example, the machine readable instructions may embody an algorithm or computer program for execution by at least one of: (a) one or more processors each having one or more processor cores, (b) hardware specifically configured to perform the instructions (e.g., ASICs, FPGAs) and (c) one or more other suitable processing device(s). The algorithm or computer program may be embodied in software stored on host system memory 218, for example.

Moreover, persons of ordinary skill in the art will readily appreciate that the entire algorithm or computer program, and/or parts thereof, could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the NIC 200, the application delivery controller device 110, or even the clients 106/server 102, could be implemented by software, hardware, and/or firmware (and combinations thereof). Further, although the example algorithm is described with reference to the flowchart illustrated in FIG. 4, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Packet switch fabric 214 includes one or more physical network ports (not shown), such as Ethernet ports, a host system bus interface 216, a classification logic module 230 and a configuration register 232. The NIC 200 accesses the memory 218 of the application delivery controller device 110 via one or more DMA transfer channels established to transfer packets 246. The packets 228 and 229 stored in the packet buffer area 224 of the memory 218 are indexed via either a high throughput queue 234 or a low latency queue 236 stored in the ring buffer area 226 in the memory 218. Incoming packets 228 or 229 may be written to the buffer area 224 by the NIC 200 for handling by the appropriate processor 210 in the application delivery controller device 110 when an interrupt is sent. A low latency pointer 252 or a high throughput pointer 254 to the location of the packet in the buffer area 224 is assigned to either the high throughput queue 234 or the low latency queue 236 in the ring buffer area 226. The queues 234 and 236 also store DMA descriptors of the packets.

As will be further explained, the NIC 200 may use the high throughput queue 234 and the low latency queue 236 to interrupt the processors 210 of the application delivery controller device 110 and direct one of the processors 210 to the location of a packet or packets in the buffer area 224 for the purpose of processing the incoming data packets depending on the type of data by sending the packets 244 to the respective applications 212 run by the host system processor(s) 210. The NIC 200 in the controller device 110 in this example may establish one or more DMA channels 246 over which to perform one or more DMA memory transfers to write data packets received by NIC 200 in the appropriate locations of the memory 218 in the application delivery controller device 110. The frequency of sending interrupts 240 to handle each of the respective queues 234 and 236 and the corresponding indexed packets in the buffer area 224 may be determined by setting the configuration register 232. The classification logic 230 may determine the type of data in incoming packets and therefore may assign the packet to one of the queues 234 or 236, which are in turn set for interrupt frequencies for either high throughput or low latency.

If the incoming packet includes data in a particular protocol that requires high throughput, such as the packets 228, the pointer or pointers 254 to the location of the packets 228 stored in the buffer area 224 may be added to the high throughput packet buffer queue or index 234. The high throughput packet queue 234 may be used with interrupt coalescing and therefore the NIC 200 allows numerous packets 228 to be stored in the buffer area 224 of the memory 218 before interrupting one or more of the host system processor(s) 210 to use the high throughput queue 234 for accessing multiple packets 228 from the buffer area 224. The intermittent interrupts 240 ensure the ability to maintain a high throughput through the NIC 200 since interrupts 240 are kept at a minimum, allowing one or more of the processor(s) 210 maximum uninterrupted processing of high throughput classified data packets. Alternatively, the high throughput queue 234 in memory 218 may be polled periodically by an application executing on one or more of the processors 210 to determine if pointers have been written in the queue, although logic in the NIC 200 could be configured to poll the memory 218 as well. In either case, the processor 210 handles the accumulated packets associated with the pointers in the high throughput queue 234.

Conversely, if the classification logic 230 determines the incoming packets require low latency, a low latency pointer 252 to the location of low latency packets 229 stored in the buffer area 224 may be added to the low latency packet buffer index or queue 236. The NIC 200 may be configured via the configuration register 232 to interrupt the processor(s) 210 immediately upon determining that a pointer 252 has been added to cause generating numerous interrupts 240 to use the low latency queue 236 for accessing the indexed packets 229, if so desired. Such a configuration would decrease the latency time for files that require multiple requests and acknowledgments to be sent for receiving the entirety of data.

One example of the classification logic 230 may classify the packets as high throughput or low latency according to the information in the packet header, such as information the logic 230 may use to either infer or directly identify the protocols that the packet data is in, since certain protocols are known to be low latency or high throughput in nature as mentioned previously, although a variety of other packet characteristics and methods may be used to classify the packets, such as using mappings maintained by the controller 110 between high throughput and low latency classifications with packets from particular data flows, for example. Alternatively, the classification logic 230 may classify packets as high throughput or low latency according to the data in the packet payload according to predefined rules for identifying certain data patterns, characteristics, or particular content, although the control 110 may be flexibly configured by a user of the controller 110, such as a network administrator, for example, to classify the packets based on any type of desired criteria.

Alternatively, a dedicated processor of the processors 210 on the application delivery controller device 110 may assist in processing packets received by the NIC 200. The dedicated processor is external to the NIC 200 and may perform various functions as described below. In this example, the NIC 200 receives the packets via the Ethernet link 206 and stores the packet in the buffer area 224 of the memory 218. The NIC 200 may pass the packet pointer to a high speed polling application 212 run by the dedicated processor 210 on the application delivery controller device 110. The high speed polling application 212 may determine whether the packet pointer should be assigned to the high throughput queue 234 or the low latency queue 236 and then adds the pointer to the appropriate queue 234 or 236 instead of the classification logic 230 in FIG. 3. As explained above, the NIC 200 then bases the interrupts 240 depending on the configuration of the queues 234 and 236 in order to maximize throughput or low latency periods for the data for the appropriate application 212.

Each of the server 102, application delivery controller device 110, and client computers 106 may include a central processing unit (CPU), controller or processor, a memory, and an interface system that are coupled together by a bus or other link, although other numbers and types of each of the components and other configurations and locations for the components can be used. The processors in the server 102, application delivery controller device 110, and client computers 106 may execute a program of stored instructions for one or more aspects of the methods and systems as described herein, including for efficient handling of different types of data, although the processor could execute other types of programmed instructions. The memory may store these programmed instructions for one or more aspects of the methods and systems as described herein, including the method for efficient handling of different types of data, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium that is read from and/or written to by a magnetic, optical, or other reading and/or writing system that is coupled to the processor, may be used for the memory. The user input device may comprise a computer keyboard and a computer mouse, although other types and numbers of user input devices may be used. The display may comprise a computer display screen, such as a CRT or LCD screen by way of example only, although other types and numbers of displays could be used.

Although an example of the server 102, application delivery controller device 110, and client computers 106 are described and illustrated herein in connection with FIGS. 1-3, each of the computers of the system 100 could be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s).

Furthermore, each of the devices of the system 100 may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software, and networking arts.

In addition, two or more computing systems or devices may be substituted for any one of the systems in the system 100. Accordingly, principles and advantages of distributed processing, such as redundancy, replication, and the like, also can be implemented, as desired, to increase the robustness and performance of the devices and systems of the system 100. The system 100 may also be implemented on a computer system or systems that extend(s) across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

The operation of the example process to handle both high throughput and low latency data shown in FIG. 4 will now be described with reference back to FIGS. 1-3. In this example, one of network traffic management application(s) 212 executing on one of the processors 210 may be communicating with a first application, such as an NFS application, which may be transmitting data packets 244 classified by the classification module 230 as being low latency type data. Moreover, the network traffic management application 212, or another one of the traffic management application(s) 212, executing on the same or a different processor 210, may be communicating with a second application, such as an FTP application, which may be transmitting data packets 244 classified by the classification module 230 as being high throughput type data.

Referring now to FIG. 4, the process begins by the NIC 200 in application delivery controller device 110 receiving one or more network data packets from one or more of the servers 102 in the LAN 104, although the packets may be received from one or more of the clients 106 in the network 108 (400).

In this example, the received packets may be in a TCP/IP protocol with a header and a payload, although the packets could be in other protocols. The classification logic 230 of the NIC 200 classifies the network data packets into at least one of high throughput classified packets and low latency classified packets based on one or more packet characteristics, which determines whether the received packet should be accessed by a processor for high throughput or low latency (402). The determination may be made based on the type of data determined through the packet header or even the data payload itself as mentioned above earlier. The determination may also be determined based on the application to receive the data or the application that sent the data. If the packet is determined to be of a high throughput type, the packet is written to the buffer area 224 of the memory 218 (404). The classification logic 230 may then write the index or pointer to the packet to the high throughput queue 234 in FIG. 2 (406).

A coalesce count is incremented after the pointer is written to the high throughput queue (408). The high throughput queue 234 is accessed by the NIC 200 according to the configuration register 232 to coalesce interrupts 240 sent to a processor, such as the host system processor(s) 210 of the application delivery controller 110 shown in FIG. 2. In this example, the NIC 200 may determine whether there are sufficient packets indexed in the queue 234 by determining if the coalesce count exceeds a threshold number (410). If there are insufficient numbers of packets, the process loops around for a next check period of receiving packets. If there are sufficient packets, the NIC 200 clears the coalesce count (412).

The NIC 200 then sends an interrupt to the appropriate processor such as the processor 210 (414). The processor 210 may receive the interrupt and access the appropriate locations of the buffer area 224 shown in FIG. 2 to receive the packets 228 (416). Since interrupts are relatively infrequent, a high throughput of data may be maintained to the processor 210, which may manage data for a high throughput application of the applications 212 in FIG. 3.

If the packet is determined to require low latency (402), the packet is written to the buffer area 224 of the memory 218 (418). The classification logic 230 then updates the low latency queue 236 (420) with the pointer to the area where the packet is stored. In this example, the NIC 200 is configured via the configuration register 232 to send an interrupt based on a new pointer written in the low latency queue 236 (422).

Since low latency classified data packets involve more frequent data accesses to process the packets for achieving low latency, the determination of whether to send an interrupt may be based on simply the arrival of a new packet written in the low latency queue 236. In this example, the NIC 200 may determine whether there is a new packet indexed in the queue 236. The NIC 200 sends an interrupt for a particular one of the processor(s) 210 to process the packet, although any available one of the processor(s) 210 could be directed to process the packet (422). The processor 210 may receive the interrupt and access the appropriate locations of the buffer area 224 shown in FIG. 3 to receive the packets 229 (424). Since interrupts 240 are relatively frequent, a low latency for data may be maintained to the processor 210, which may manage data for a low latency application of the applications 212 in FIG. 3. It is to be understood that the interrupts 240 may be coalesced for the low latency queue 236 after a small number of pointers have been written to the low latency queue 236 instead of after each pointer as explained above. Thus, the interrupt timing with respect to processing data packets classified as low latency and data packets classified as high latency will be different to optimize the efficiency of the processors 210.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. For example, different non-TCP networks may be selected by a system administrator. Also, rather than having one device or server with different processors, a virtualized server where one guest operating system is running a low latency application and another guest operating system is running a high throughput application may be serviced via the network interface controller. The processes described herein may be applied to egress or ingress packets. In such a case, the host processor 210 of the application controller 110, after the application running on the processor 210 finishes processing a packet from the LAN 104, would notify the NIC 200 to let it know that it has buffered a packet into host memory 218 that is ready to be transmitted out to the network by the NIC 200 (and DMA transferred by the NIC from the host memory when it is ready to do so). The order that the measures are implemented may also be altered. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the disclose technology is limited only by the following claims and equivalents thereto.

What is claimed is:

1. A method for processing network data packets destined for applications with a plurality of throughput and latency requirements, the method comprising:
   receiving by an application delivery controller apparatus data packets from a network;
   classifying by the application delivery controller apparatus the data packets as high throughput classified and low latency classified based on one or more characteristics of each of the data packets, wherein the low latency classified packets are processed by a first processor and the high throughput classified packets are processed by a second processor;
   storing by the application delivery controller apparatus the data packets in a respective one of a low latency packet queue or a high throughput packet queue based on the classification;
   processing by the application delivery controller apparatus low latency classified packets from the low latency packet queue;
   determining by the application delivery controller apparatus when a predetermined number of the data packets are stored in the high throughput packet queue; and
   when it is determined that the predetermined number of the data packets are stored in the high throughput packet queue:
      interrupting by the application delivery controller apparatus the processing of the low latency classified packets and processing one or more high throughput classified packets from the high throughput packet queue; and
      resuming by the application delivery controller apparatus the processing of the low latency classified packets upon processing a number of the high throughput classified packets.

2. The method of claim 1, wherein the determining further comprises at least one of:
   polling a memory to determine whether the predetermined number of the data packets are stored in the high throughput packet queue; or
   determining when any other condition exists such that high throughput classified packets should be processed instead of low latency classified packets.

3. The method of claim 1, further comprising interrupting by the application delivery controller apparatus a processor upon at least one of the classifying the data packets or the storing the data packets in the low latency packet queue.

4. The method of claim 3, wherein there are fewer data packets stored in the low latency packet queue than the high throughput packet queue when the interrupting of the processing of the low latency classified packets occurs.

5. The method of claim 1, wherein the receiving, classifying, storing, processing, determining, interrupting, and resuming steps are performed by a blade coupled to a chassis apparatus of the application delivery controller apparatus.

6. The method of claim 1, wherein the one or more characteristics are selected by a network traffic management application executed by a processor.

7. A non-transitory computer-readable medium having instructions stored thereon, which when executed by a processor of an application delivery controller device, causes the application delivery controller device to perform steps to and that comprise:
   receive data packets from a network;
   classify the data packets as high throughput classified and low latency classified based on one or more characteristics of each of the data packets, wherein the low latency classified packets are processed by a first processor and the high throughput classified packets are processed by a second processor;
   store the data packets in a respective one of a low latency packet queue or a high throughput packet queue based on the classification;
   process low latency classified packets from the low latency packet queue;
   determine when a predetermined number of the data packets are stored in the high throughput packet queue;
   when it is determined that the predetermined number of the data packets are stored in the high throughput packet queue:
      interrupt the processing of the low latency classified packets and processing one or more high throughput classified packets from the high throughput packet queue; and
      resume the processing of the low latency classified packets upon processing a number of the high throughput classified packets.

8. The computer-readable medium of claim 7, wherein the determining further comprises at least one of:
   poll a memory to determine whether the predetermined number of the data packets are stored in the high throughput packet queue; or
   determine when any other condition exists such that high throughput classified packets should be processed instead of low latency classified packets.

9. The computer-readable medium of claim 7, further comprises interrupt a processor upon at least one of the classifying the data packets or the storing the data packets in the low latency packet queue.

10. The computer-readable medium of claim 9, wherein there are fewer data packets stored in the low latency packet queue than the high throughput packet queue when the interrupting of the processing of the low latency classified packets occurs.

11. The computer-readable medium of claim 7, wherein the receiving, classifying, storing, processing, determining, interrupting, and resuming steps are performed by a blade coupled to a chassis apparatus of an application delivery controller device.

12. The computer-readable medium of claim 7, wherein the one or more characteristics are selected by a network traffic management application executed by a processor.

13. An application delivery controller apparatus comprising:
   one or more processors configured to be capable of executing one or more traffic management applications;
   a memory;
   a network interface controller coupled to the one or more processors and the memory and configured to be capable of receiving data packets from a network that relate to the one or more network traffic management applications; and
   at least one of the one or more processors or the network interface controller configured to execute programmed instructions stored in the memory to and that comprise:
      classify the data packets as high throughput classified and low latency classified based on one or more characteristics of each of the data packets, wherein the low latency classified packets are processed by a first processor and the high throughput classified packets are processed by a second processor;
      store the data packets in a respective one of a low latency packet queue or a high throughput packet queue in the memory based on the classification;
      process low latency classified packets from the low latency packet queue;
      determine when a predetermined number of the data packets are stored in the high throughput packet queue; and
      when it is determined that the predetermined number of the data packets are stored in the high throughput packet queue:
         interrupt the processing of the low latency classified packets and processing one or more high throughput classified packets from the high throughput packet queue; and
         resume processing the low latency classified packets upon processing a number of the high throughput classified packets.

14. The apparatus of claim 13, wherein the determining further comprises at least one of:
   poll the memory to determine whether the predetermined number of the data packets are stored in the high throughput packet queue; or
   determine when any other condition exists such that high throughput classified packets should be processed instead of low latency classified packets.

15. The apparatus of claim 13, wherein at least one of the one or more processors or the network interface controller is further configured to execute programmed instructions stored in the memory further to and that further comprises interrupt at least one of the one or more processors upon at least one of the classifying the data packets or the storing the data packets in the low latency packet queue.

16. The apparatus of claim 15, wherein there are fewer data packets stored in the low latency packet queue than the high throughput packet queue when the interrupting of the processing of the low latency classified packets occurs.

17. The apparatus of claim 13, wherein the network interface controller comprises at least one of a programmable logic device (PLD), a field programmable logic device (FPLD), a field programmable gate array (FPGA), stored executable instructions, or any other configurable logic.

18. The apparatus of claim 13, wherein classifying the data packets further comprises:
   write a first pointer to a memory location of the data packets stored in the low latency packet queue into a first buffer index area in the memory; and
   write a second pointer to another memory location of the data packets stored in the high throughput packet queue into a second buffer index area in the memory.

19. The apparatus of claim 13, wherein the application delivery controller apparatus comprises at least one of a blade coupled to an application delivery controller chassis device or a standalone application delivery controller device.

20. The apparatus of claim 13, wherein the low latency classified packets are processed by a first processor and the high throughput classified packets are processed by a second processor.

21. The apparatus of claim 13, wherein the one or more characteristics are selected by the one or more network traffic management applications.

* * * * *